United States Patent
Vasant et al.

(10) Patent No.: US 10,623,371 B2
(45) Date of Patent: Apr. 14, 2020

(54) PROVIDING NETWORK BEHAVIOR VISIBILITY BASED ON EVENTS LOGGED BY NETWORK SECURITY DEVICES

(71) Applicant: Cisco Technology, Inc., San Jose, CA (US)

(72) Inventors: Sachin Vasant, Brookline, MA (US); Umesh Kumar Miglani, North Chelmsford, MA (US); Zachary D. Siswick, Framingham, MA (US); Doron Levari, Cambridge, MA (US); Yedidya Dotan, Newton, MA (US)

(73) Assignee: Cisco Technology, Inc., San Jose, CA (US)

(*) Notice: Subject to any disclaimer, the term of this patent is extended or adjusted under 35 U.S.C. 154(b) by 672 days.

(21) Appl. No.: 15/237,142

(22) Filed: Aug. 15, 2016

(65) Prior Publication Data
US 2017/0155562 A1    Jun. 1, 2017

Related U.S. Application Data

(60) Provisional application No. 62/261,495, filed on Dec. 1, 2015.

(51) Int. Cl.
*H04L 12/26* (2006.01)
*H04L 29/06* (2006.01)

(52) U.S. Cl.
CPC ...... *H04L 63/0227* (2013.01); *H04L 63/1408* (2013.01); *H04L 63/20* (2013.01)

(58) Field of Classification Search
CPC ................. H04L 12/26; H04L 29/12
(Continued)

(56) References Cited

U.S. PATENT DOCUMENTS 7,657,626 B1 * 2/2010 Zwicky ............... G06Q 30/02
                                                                705/51
9,043,464 B1    5/2015 Trainor et al.
(Continued)

OTHER PUBLICATIONS

G. Cormode et al., "Finding Hierarchical Heavy Hitters in Streaming Data", ACM Transactions on Database Systems, vol. V, No. N, Oct. 2007, 43 pages.

*Primary Examiner* — Vivek Srivastava
*Assistant Examiner* — Sibte H Bukhari
(74) *Attorney, Agent, or Firm* — Edell, Shapiro & Finnan, LLC

(57) ABSTRACT

A network management entity is configured to communicate with one or more network security devices. Each network security device is configured to store in a respective event queue an event for each attempt to access a network accessible destination through the security device. Each event indicates the destination of the attempted access. The management entity periodically collects from the event queues the stored events so that less that all of the events stored in the event queues over a given time period are collected. The management entity determines, based on the collected events, top destinations as the destinations that occur most frequently in the collected events. The management entity determines, based on the collected events, bottom destinations as the destinations that occur least frequently in the collected events. The management entity generates for display indications of the top destinations and generates for display indications of the bottom destinations.

22 Claims, 13 Drawing Sheets

(58) Field of Classification Search
USPC .......................................................... 709/224
See application file for complete search history.

(56) References Cited

U.S. PATENT DOCUMENTS

| | | |
|---|---|---|
| 9,256,686 B2 | 2/2016 | Woodruff |
| 9,400,995 B2 | 7/2016 | Gu et al. |
| 2007/0283194 A1* | 12/2007 | Villella ............... G06F 11/3476 |
| | | 714/57 |
| 2008/0301218 A1 | 12/2008 | Mukherjee et al. |
| 2009/0073891 A1 | 3/2009 | Duffield et al. |
| 2012/0233000 A1* | 9/2012 | Fisher .................... G06O 30/02 |
| | | 705/14.71 |
| 2015/0088868 A1* | 3/2015 | Jordan .................. G06F 16/248 |
| | | 707/722 |
| 2017/0300966 A1* | 10/2017 | Dereszynski ...... G06Q 30/0254 |

\* cited by examiner

PROVIDING NETWORK BEHAVIOR VISIBILITY BASED ON EVENTS LOGGED BY NETWORK SECURITY DEVICES

PRIORITY CLAIM

This application claims priority to U.S. Provisional Patent Application No. 62/261,495, filed Dec. 1, 2015, the entirety of which is incorporated herein by reference.

TECHNICAL FIELD

The present disclosure relates to monitoring network behavior and security.

BACKGROUND

A goal of securing a network is to be able to collect information on how the network behaves and to learn qualitative and quantitative characteristics of network traffic flowing through the network. Also, if threats such as malware are detected by malware tools and intrusion prevention systems, it is useful to be informed about such threats at a central location. However, in a distributed network environment, there are many network security devices through which network traffic flows. Each security device generates up to thousands of network accesses and related events per second. Users of the network may be in branches, distributed offices and use cloud services. All of these factors make collecting and analyzing information related to the network traffic difficult.

DESCRIPTION OF EXAMPLE EMBODIMENTS

Overview

A management entity is configured to communicate with one or more network security devices. Each network security device is configured to store in a respective event queue an event for each attempt to access a network accessible destination through the security device. Each event indicates the destination of the attempted access. The management entity periodically collects from the event queues the stored events so that less that all of the events stored in the event queues over a given time period are collected. The management entity determines, based on the collected events, top destinations as the destinations that occur most frequently in the collected events. The management entity determines, based on the collected events, bottom destinations as the destinations that occur least frequently in the collected events. The management entity generates for display indications of the top destinations and generates for display indications of the bottom destinations.

DETAILED DESCRIPTION

Figure 1:
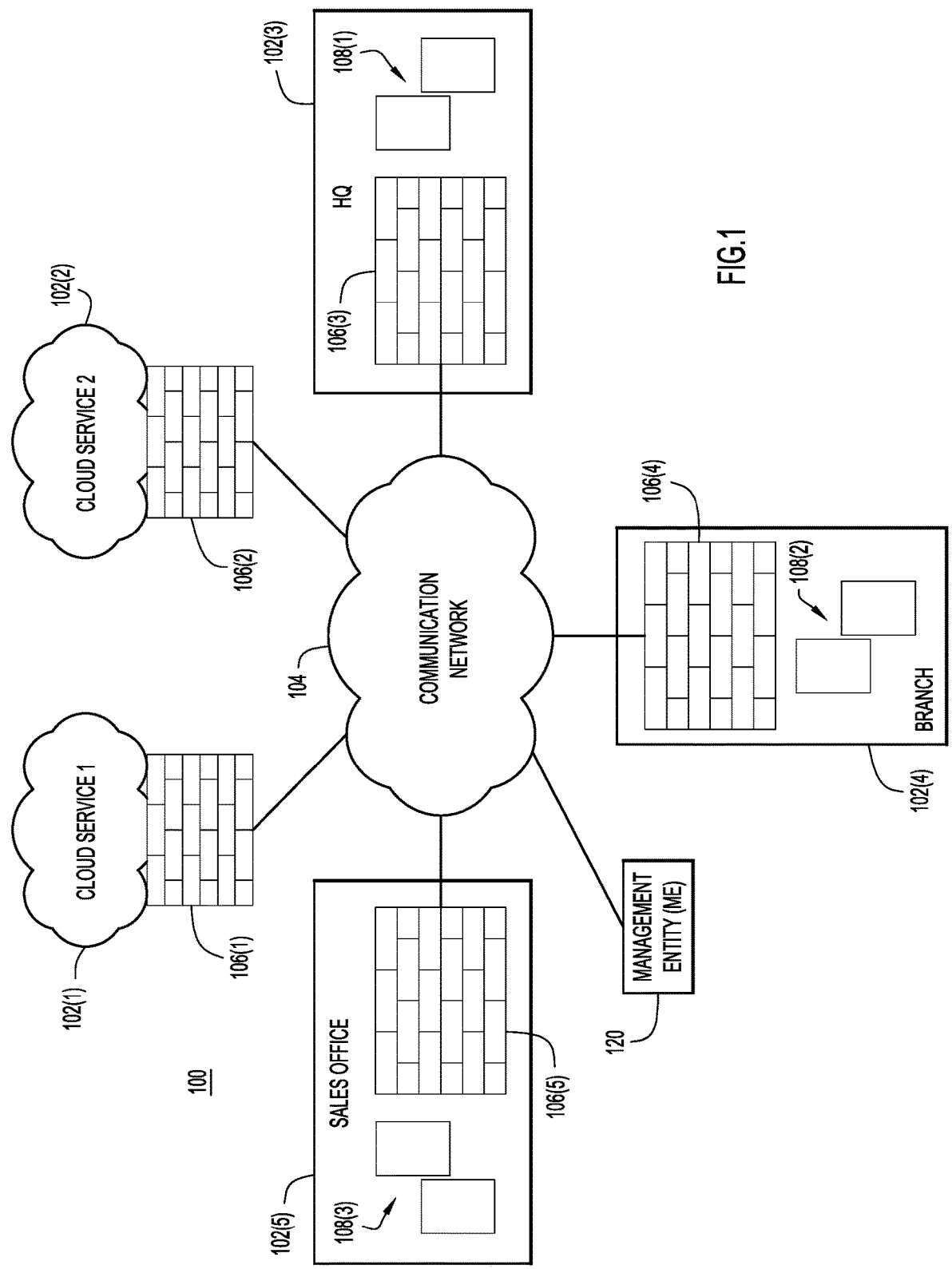
FIG. 1 is an illustration of a distributed network environment in which embodiments directed to providing network visibility based on network events collected from network security devices may be implemented, according to an example embodiment.

With reference to FIG. 1, there is an illustration of an example distributed network environment 100 in which embodiments directed to providing network visibility based on network events collected from network security devices may be implemented. In environment 100, distributed cloud services 102(1) and 102(2), and distributed enterprise offices, including a headquarters (HQ) 102(3), a branch office 102(4), and a sales office 102(5), each communicate with a network 104 through respective ones of network security devices 106(1)-106(5) associated with the distributed sites. For example, groups of user or client devices 108(1), 108(2), and 108(3) (collectively, user devices 108) communicate with network 104 through respective network security devices 106(3), 106(4), and 106(5), while server devices (not shown in FIG. 1, and referred to simply as "servers") associated with cloud services 102(1) and 102(2) communicate with the network through respective network security devices 106(1) and 106(2). Network security devices 106(1)-106(5) implement network security policies to control and monitor network traffic, including data packets (e.g., Internet Protocol (IP) packets), flowing through the network security devices between network 104 and user devices 108 and the servers. Network 104 may include one or more local area networks (LANs) and one or more wide area networks (WANs), such as the Internet. In the ensuing description, a network security device is referred to as simply as a "security device." Also, security devices 106

(1)-106(5) are collective referred to as security devices 106, and network sites 102(1)-102(5) are collectively referred to as sites 102.

Security devices 106 generate and capture information associated with high volumes of different types of network events (referred to simply as "events") associated with the network traffic. The types of events include, but are not limited to, attempts by devices and services at sites 102 to access destinations in network 104, attempts by devices and services in the network to access the sites, statuses of the access attempts (e.g., success or failure, and blocked or permitted by the respective security device), detected intrusions by threats and the presence of malware/viruses, and identities of applications associated with the network accesses. Each security device 106(i) may generate thousands of events per second. As used herein, the term "event" may refer to an action (e.g., a network access through a security device), the information related to the action that is captured by a security device, or both, depending on the context in which the term is used.

It is helpful to perform analysis of the above-mentioned events to generate results for use by a network administrator in managing the relevant networks; however, given the usually high number of distributed security devices and the high volume of events at each security device, capturing all of the events across the security devices for analysis presents a significant challenge. One challenge is that a network management device that collects the network events for analysis may not be centrally connected with respect to the distributed security devices, rendering collection of events from the security devices difficult. Even if the network management device could collect all of the events, it may not have sufficient memory to store all of the collected events for a long enough period of time to allow for useful analysis of all of the events and presentation of results of the analysis to the network administrator. Furthermore, collecting all of the events from a given security device may tax that security device in terms of storage, compute, and network resources to a point that the security device may not function properly.

Accordingly, network environment 100 also includes a network management entity 120 (referred to simply as "management entity 120") configured to communicate with security devices 106 over network 104 and address the above-mentioned challenges related to event collection and analysis. More specifically, and in accordance with embodiments presented herein, management entity 120 collects from security devices 106 only snapshots of all of the events recorded individually by each security device over time, performs analysis on the snapshots from all of the security devices to derive results reflective of all of the events, and presents the results to provide network behavior visibility, as will be described below.

Figure 2:
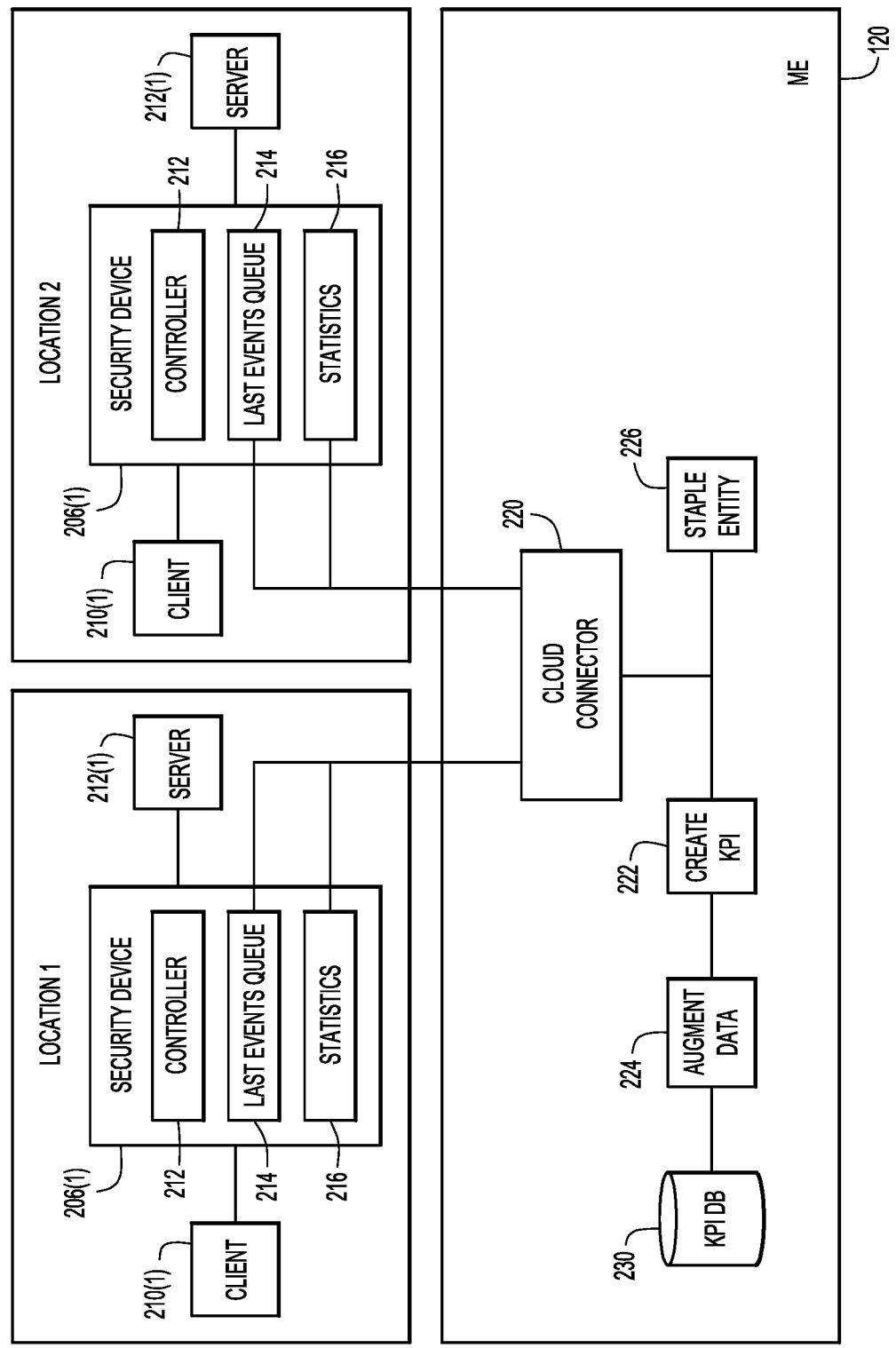
FIG. 2 is a block diagram of a system in which a network management entity from the environment of FIG. 1 handles event reporting/collection from network security devices, and analyzes the collected events, according to an example embodiment.

With reference to FIG. 2, there is a block diagram of an example system 200 in which management entity (ME) 120 handles (i) event reporting/collection from security devices 206(1) and 206(2) at respective/sites location 1 and location 2, (ii) analysis of the collected events, and (iii) presentation of the analysis results. Security devices 206(1) and 206(2) may each correspond to any of security devices 106 discussed above in connection with FIG. 1, for example. For simplicity, only two locations are shown, and at each location there is a single security device, but it is understood that there are typically numerous locations and each location includes many security devices.

Security device 206(1) controls and monitors network traffic flowing (or attempting to flow) between a client device 210(1) and a server 212(1). The network traffic may flow to/from network 104 (not shown in FIG. 2). Similarly, Security device 206(2) controls and monitors network traffic between a client device 210(2) and a server 212(2). More generally, client devices 210 and servers 212 are simply examples of many different types of network accessible "entities" or "resources" that may be accessed through/via security devices 206, including without limitations, cloud-based services, servers, client devices, and applications hosted on computer devices.

Security devices 206 each include respective ones of a controller 212 to control the security device, event queues 214 (labeled "Last Event Queues") including fixed length queues to log/store different types of events, and a statistical engine 216 to generate statistics based on the logged events. Security devices 206 are configured and operate similarly to each other, so the ensuing description of security device 206(1) shall suffice for security device 206(2).

Security device 206(1) logs/stores (i) typical network access events in a first fixed length event queue of event queues 214 for network traffic flowing (or attempting to flow) between client device 210(1) and server 212(1) through the security device, and (ii) high priority events, such as malware and intrusion attempts, in a second fixed length event queue in event queues 214. The first and second fixed length event queues may each be configured as a first-in-first-out (FIFO) in which new/incoming events overwrite previously logged events when the FIFO is full, or may use other limited-time-to-live mechanisms. Thus, each event queue contains only most recent events.

The events stored in the fixed length event queues represent network accesses, including, for example, client requests originated at client device 210(1) destined for server 212(1), and server responses originated at the server and destined for the client device. In an example, the client/server requests/responses may be Hypertext Transfer Protocol (HTTP) requests/responses. An example event stored in event queues 214 is illustrated in FIG. 3, described below.

Statistical engine 216 generates and maintains counts of key performance indicators (KPIs) related to the logged events based on:

a. Network connections (including source and destination sides of the connections).
b. User activity per user and user group.
c. Threats and malware seen.
d. Applications and protocols of network traffic.

Figure 3:
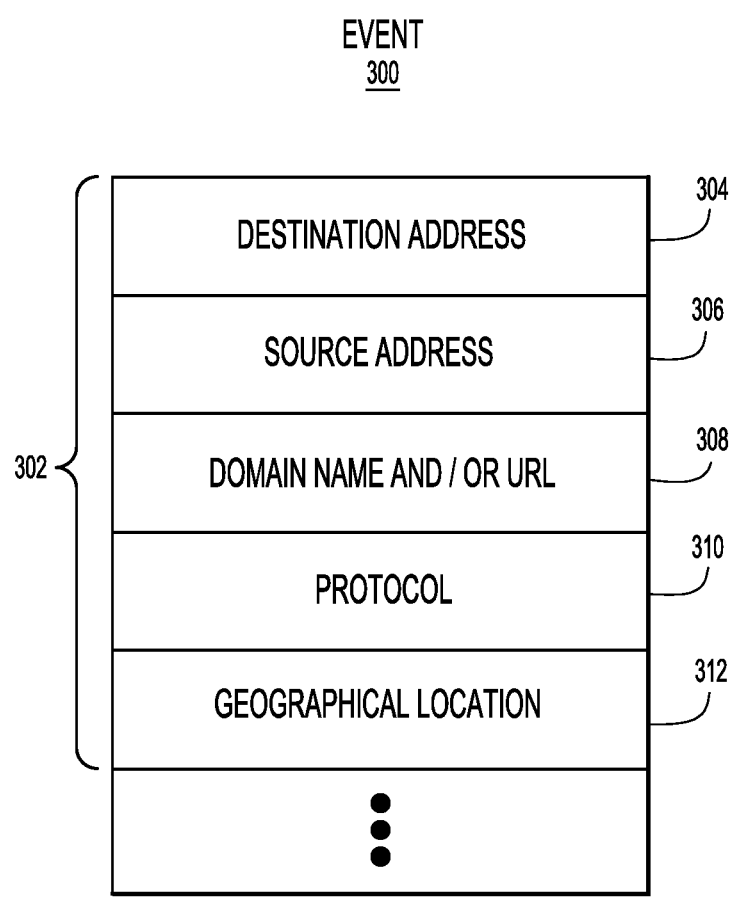
FIG. 3 is an illustration of an event stored in an event queue of one of the network security devices, according to an example embodiment.

With reference to FIG. 3, there is an illustration of an example event 300 stored in event queues 214 for a network access. Event 300 may include information 302 from a header of a data packet (e.g., from an IP packet header) to which the event relates, such as a network destination address 304 (e.g., an IP destination address), a network source address 306 (e.g., an IP source address), a network domain name and/or a network Uniform Resource Locator (URL) 308, and a network protocol 310. Event 300 may also include one or more geographical locations 312 associated with the network addresses 304 and 306. A given network accessible entity, such as a server, service, client device, and the like may be represented or indicated by one or more of the descriptors of event 300, including network addresses 304 and 306, domain name and/or URL 308, and geographical location 312. The event 300 may include only a subset of the information indicated in FIG. 3, or information that is different from the information that is shown.

Returning to FIG. 2, ME 120 may be a cloud-based management entity that provides network administration services. ME 120 includes multiple interconnected logic modules/processes to collect and analyze event logs, and present analysis results. The modules/processes include: a Cloud Connector 220 to collect events from security devices 206(1) and 206(2) over a network, such as network 104; a Create KPI process 222 to generate statistics based on the collected logs; an Augment Data process 224 to enrich the statistics generated by the Create KPI process; and a Staple Entity Process 226 to generate an expanded or deep-dive view of selected ones of the statistics. ME 120 also includes a KPI database 230 to store results generated by and data used by modules/processes 220-226. The operation of ME 120 is now described at a high level in connection to FIG. 4.

Figure 4:
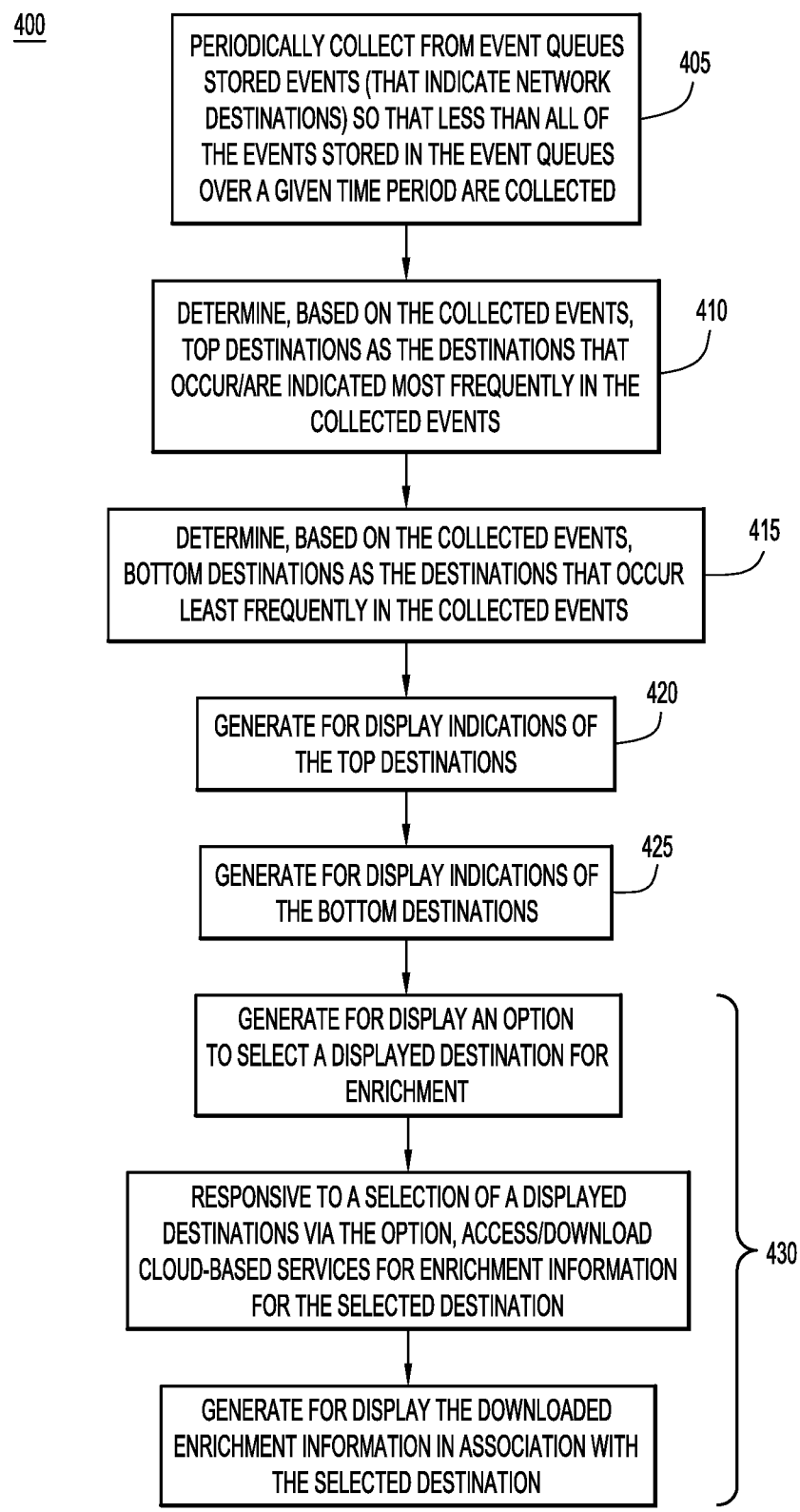
FIG. 4 is a flowchart of a high-level method of collecting and analyzing events from distributed network security devices to provide network visibility, performed by the network management entity, according to an example embodiment.

With reference to FIG. 4, there is a flowchart of an example high-level method 400 of collecting and analyzing events from distributed security devices (e.g., security devices 106/206), and presenting results of the analysis to provide network behavior visibility, performed by ME 120. As described above, ME 120 communicates with the security devices over a network, such as network 104. Each of the security devices stores in a respective event queue events for network traffic attempting to flow through or actually flowing through the security device to and from entities (e.g., servers, cloud-based services, client devices, applications, and so on) over the network. Each stored event indicates the entity to or from which the traffic is flowing or attempting to flow. In a more specific example, each of the security devices logs a respective event in the event queue of the security device each time there is an attempt to access a network accessible destination through the security device, where the event indicates the destination, e.g., an IP address and/or a domain name or URL. Thus, events convey information about network destinations.

Operations 405-430 described below may be allocated across modules/processes 220-226 of network ME 120 as follows: operation 405 may be implemented in Cloud Connector 220; operations 410-425 may be implemented in Create KPI process 222; and operation 430 may be implemented in Augment Data process 224.

At 405, ME 120 periodically collects from the event queues of the security devices the events stored in the event queues so that less than all of the events stored in the event queues over a given time period are collected. In an example, a rate at which each security device logs network access events in its event queue is at least 100 times higher than a rate at which ME 120 polls the queue in that security device. Because of this 100:1 ratio and the fact that the events in each event queue are frequently overwritten by the respective security device, ME 120 collects only a small fraction, e.g., typically much less than 1%, of all of the events available in the event queues over a given time period. At 405, ME 120 also determines if each of the collected events is new, and discards it if it is not. ME 120 also collects high value events from the security devices and discards those that are not new.

At 410, ME 120 determines, based on the collected events, "top" destinations as those destinations that occur (e.g., are indicated or seen) most frequently in the collected events. In an embodiment, ME 120 uses a hierarchical "heavy hitters" algorithm to determine the top destinations as those destinations having respective numbers of occurrences above a predetermined threshold number of occurrences indicative of top destination status, as described below in connection with FIGS. 5 and 6. It is understood that a given number of occurrences of a destination over a given time period is equivalent to a frequency of occurrence, or frequency count, of that destination, and vice versa.

At 415, ME 120 determines, based on the collected events, "bottom" destinations as those destinations that occur least frequently in the collected events. In an embodiment, ME 120 maintains a bottom destinations list of a predetermined number of destinations (i.e., bottom destinations) that occur least frequently in the collected events. The bottom destinations list is updated in connection with a Bloom filter populated with collected events, as is described below with reference to FIGS. 7 and 8.

Operations 410 and 415 together avoid a substantial number of "intermediate" destinations that occur in the collected events more frequently than the bottom destinations but less frequently than the top destinations. An advantage of avoiding the intermediate destinations is that network administrators are typically more interested in knowing the top and bottom destinations than in knowing the intermediate destinations, which tend to clutter presentation of analysis results with less important information. The number of intermediate destinations avoided can be increased/decreased if a predetermined threshold number of occurrences indicative of top destination status is increased/decreased and/or if a predetermined number of bottom destinations is decreased/increased.

At 420, ME 120 generates for display and/or displays indications of the top destinations and various statistics associated with the top destinations, such as their frequency of occurrences or numbers of occurrences over a given time period. In an example, the top destinations may be presented as a histogram plotting destination (e.g., network address, domain name, geographical location, and the like) vs. number of occurrences.

At 425, ME 120 generates for display and/or displays indications of the bottom destinations and various statistics associated with the bottom destinations, such as their frequency of occurrences or numbers of occurrences over a given time period. In an example, the bottom destinations may be presented as a histogram plotting destination identifier (e.g., network address, domain name, geographical location, and the like) vs. number of occurrences.

At 430, ME 120 selectively enriches the presentation of the destinations displayed at 420 and 425. To do this, ME 120 generates for display an option by which a user is able to select one of the displayed top or bottom destinations for enrichment. Responsive to a selection (received by ME 120) of one the displayed destinations via the option, ME 120 uses identifying information available from the collected events associated with the selected destination, such as a network address or a domain name, to solicit enrichment information associated with the selected destination from a cloud-based service that provides the enrichment information. Such cloud-based services include services that associate reputations (e.g., good, average, poor) and categories (e.g., search, shopping, and the like) with identified destinations. Any currently known or hereafter developed cloud-based service may be accessed for the enrichment information. ME 120 downloads the enrichment information returned by the cloud-based service. ME 120 generates for display and/or displays the enrichment information downloaded from the service, e.g., the reputation and the category information, in association with the selected destination.

ME 120 may also generate for display "staple" information responsive to a selection of a destination by the user. Stapling a destination results in collecting all events seen (i.e., collected) for the stapled destination. ME 120 may also access from a cloud-based threat database, download from the threat database, and then generate for display threat data associated with a selected one of displayed destination by the user.

As described above, operation 410 may include a heavy hitter algorithm to determine top destinations among the collected events. The top destinations may simply be IP addresses that occur most frequently; however, a destination IP address alone may not sufficiently identify a top destination of interest. For example, a large scale web-server/service may assign multiple IP addresses to a given URL for scalability. In that case, the destination of interest is the URL that maps to the multiple IP addresses, not simply one IP address. In another example, there may be a situation in which a sudden burst of network traffic targets a specific country as a destination. In that case, there may be many infrequent IP addresses in the burst, but all of those IP addresses point to the same country, which then becomes the destination of interest.

To handle these and other cases, it is useful to represent a destination as a finite sequence or ordered list of destination elements/attributes (IP address,URL,country), i.e., as a tuple of this form. Various attributes in corresponding attribute positions of the tuple may be generalized to form generalized tuples, including: (*,URL,country), which generalizes on URL and country; (*,*,country), which generalizes on country; and (*,URL,*), which generalizes on URL. In the aforementioned generalized tuples, the descriptor "*" means "any," e.g., any IP address, any URL, etc.

Destinations in tuple, and generalized tuple, form may be coalesced or merged at different levels of a hierarchy of such destinations. Thus, an input stream of collected events in which destinations are represented as tuples/generalized tuples also represents a hierarchical dataset. Assuming a frequency parameter u represents a predetermined threshold frequency of occurrence (or, equivalently, a predetermined threshold number of occurrences over a given time period) above which a top destination (i.e., a "heavy hitter") is indicated, a hierarchical heavy hitter algorithm identifies hierarchical heavy hitters in the dataset as:
  a. Any tuple that occurs with a frequency greater than u; and
  b. Any generalized tuple having a cumulative frequency of all of its descendant tuples (that are coalesced into the generalized tuple) that are not heavy hitters themselves greater than u.

Figure 5:
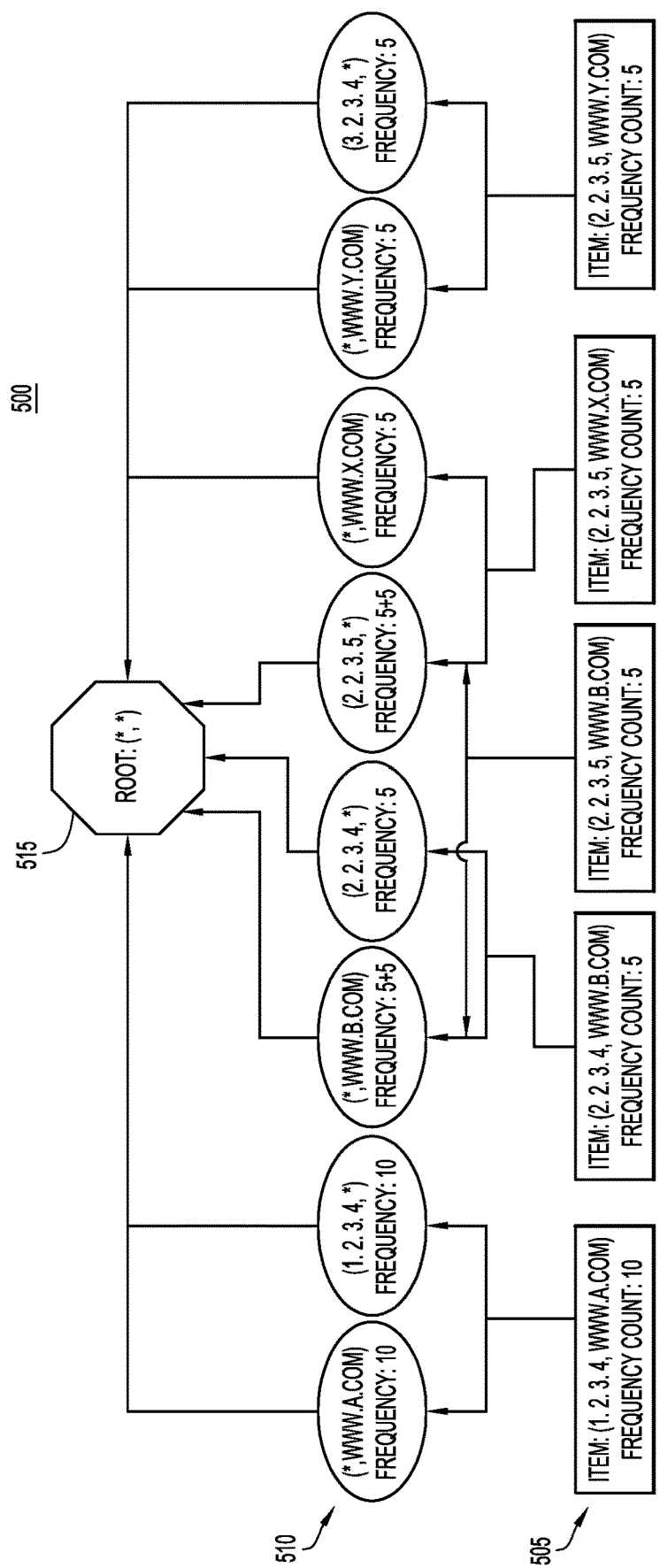
FIG. 5 is an illustration of a hierarchical data set generated by a "heavy hitters" hierarchical algorithm that determines top destinations from collected events, according to an example embodiment.

With reference to FIG. 5, there is an illustration of an example hierarchical data set 500 generated by an example heavy hitters hierarchical (HHH) algorithm. In the example of FIG. 5, the HHH algorithm receives destinations in the collected events as two dimensional tuples of the form (IP address,URL), e.g., (1.2.3.4, www.a.com), and (2.2.3.4,www.b.com). Thus, the HHH algorithm generalizes on, and coalesces, IP addresses and URLs, as described below. In FIG. 5, tuples and generalized tuples are each referred to more generally as an "item."

The HHH algorithm receives a stream of collected events in tuple form.

First, the HHH algorithm coalesces instances/occurrences of the received tuples that are the same and populates a bottom layer 505 of hierarchical dataset 500 with the resulting coalesced tuples. Each coalesced tuple is associated with a frequency count or number of occurrences of that tuple that is counted by the HHH algorithm. For example, traversing bottom layer 505 from left-to-right, a tuple/item (1.2.3.4, www.a.com) is seen 10 times, a tuple (2.2.3.4, www.b.com) is seen 5 times, a tuple (2.2.3.5, www.b.com) is seen 5 times, and so on across the bottom layer. Thus, bottom layer 505 represents the actual stream of events (destinations) received by the HHH algorithm.

Next, the HHH algorithm generalizes on only one attribute/attribute position of the tuple, e.g., on the IP address alone or the URL attribute alone, to form generalized tuples into which tuples are coalesced as appropriate based on the generalized attribute, and populates a first parent layer 510 of hierarchical data set 500 with the generalized tuples. Thus, at first parent level 510, the HHH algorithm has generalized/coalesced on only one attribute in the tuple. Each generalized tuple is associated with a cumulative frequency count or a cumulative number of occurrences that is determined by the HHH algorithm. Each cumulative frequency count or cumulative number of occurrences is a sum of the number of occurrences of the tuples coalesced into the generalized tuple.

Finally, the HHH algorithm generalizes on all tuple attributes/attribute positions to populate a top-most layer 515 with a node that presents no information.

After the HHH algorithm populates hierarchical levels 505, 510, and 515, or while the algorithm populates the layers, the HHH algorithm traverses the layers to identify tuples and generalized tuples that are hierarchical heavy hitters. Generally, heavy hitters are the tuples and generalized tuples with numbers of occurrences and cumulative numbers of occurrences above the predetermined threshold number of occurrences (u), respectively.

In an example, assume it is desired to identify top destinations that occur in at least 30% of the events (where frequency u mentioned above represents all below 30%). The HHH algorithm identifies as the hierarchical heavy-hitters:
  a. Tuple (1.2.3.4, www.a.com) because this event occurs 10 times (33% of all events).
  b. Generalized tuple (*,www.b.com) because this event occurs 10 times (33% of all events), but its children which are (2.2.3.4,www.b.com) and (2.2.3.5, www.b.com) each occur 5 times only (17% of all events) and thus are not heavy-hitters themselves; and
  c. Generalized tuple (2.2.3.5,*): This event occurs 10 times, but its children (2.2.3.5, www.b.com) and (2.2.3.5,www.x.com) occur only 5 times each.

Generalized tuples (*,www.a.com) and (1.2.3.4,*) are not heavy-hitters despite occurring 10 times because their child tuple (1.2.3.4,www.a.com) is a heavy-hitter itself, and the generalized tuple does not occur without the child heavy-hitter.

The HHH algorithm and data set 500 described above may be extrapolated from 2 to 3 attribute tuples in the form (IP address,URL,location), e.g., (1.2.3.4, www.a.com, USA), and so on, the goal being to coalesce on IP address, URL, and country. As described above, the first levels of parents generalize on only one attribute. Thus, the parents of (1.2.3.4,www.a.com,USA) will be (*,www.a.com,USA), (1.2.3.4,*,USA), and (1.2.3.4, www.a.com,*). The grandparents generalize on two attributes. Therefore, the grandparents of (1.2.3.4, www.a.com,USA) are (1.2.3.4,*,*), (*,www.a.com,*) and (*,*,USA). The root-element (i.e., top-most layer) is generalized on all attributes.

Figure 6:
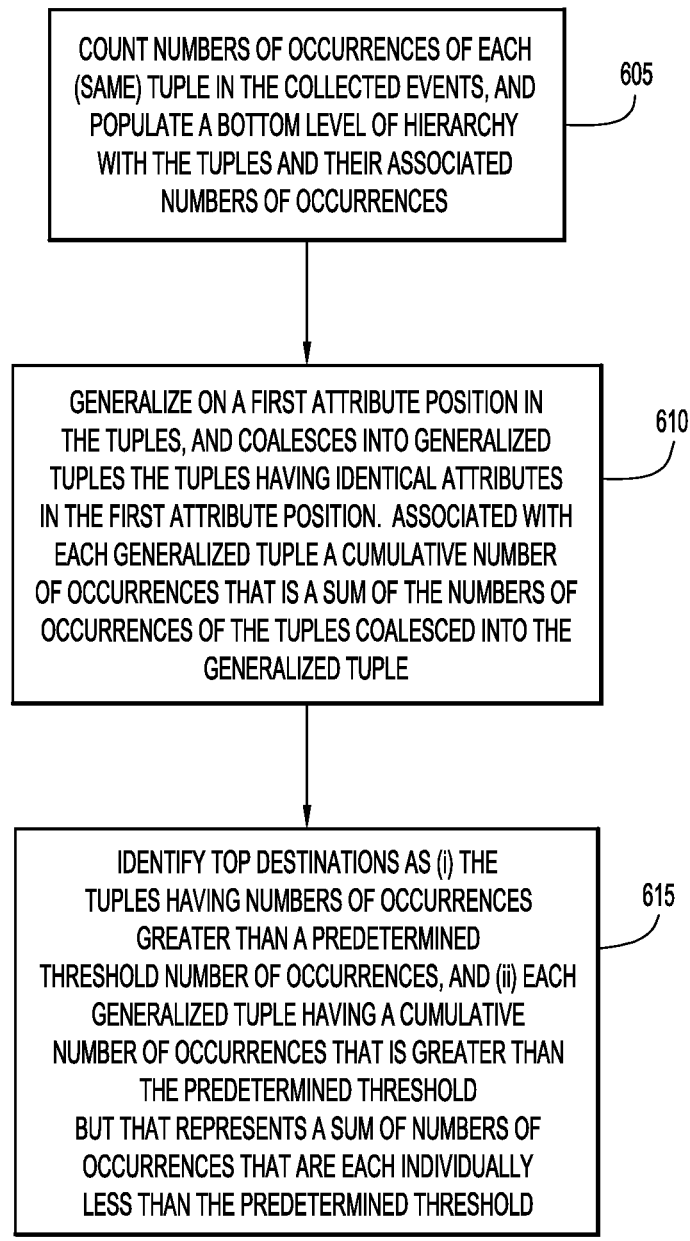
FIG. 6 is a flowchart of a heavy hitters algorithm that includes operations described in connection with FIG. 5, according to an example embodiment.

With reference to FIG. 6, there is a flowchart of an example HHH algorithm 600 that includes operations described above in connection with FIG. 5 and that is performed by ME 120. It is assumed that algorithm 600 receives a stream of the collected events in which each event includes a tuple having destination attributes in corresponding attribute positions of the tuple, as described above.

At 605, algorithm 600 counts a number of occurrences of each (same) tuple in the collected events, and populates a bottom level of a heavy hitter hierarchy with the tuples.

At 610, algorithm 600 generalizes on a first of the attribute positions in the tuples (e.g., on IP address alone, URL/domain name alone, or on location alone), and coalesces into generalized tuples the tuples having identical attributes in the first of the attribute positions. Each of the generalized tuples is associated with a cumulative number of occurrences that is a sum of the number of occurrences of the tuples coalesced into the generalized tuple.

At 615, algorithm 600 identifies the top destinations based on the number of occurrences of the tuples, the cumulative numbers of occurrences of the generalized tuples, and a predetermined threshold number of occurrences indicative of the top destinations, which is adjustable/programmable. More specifically, algorithm 600 identifies the top destinations as (i) the tuples having numbers of occurrences greater than the predetermined threshold number of occurrences, and (ii) each generalized tuple having a cumulative number of occurrences that is greater than the predetermined threshold number of occurrences but that represents a sum of numbers of occurrences (of the tuples coalesced into the generalized tuple) that are each individually less than the predetermined threshold number of occurrences.

Operations 610 and 615 may be repeated while generalizing on more than one of the attribute positions to produced even further generalized tuples, which may include further heavy hitter generalized destinations.

Figure 10:
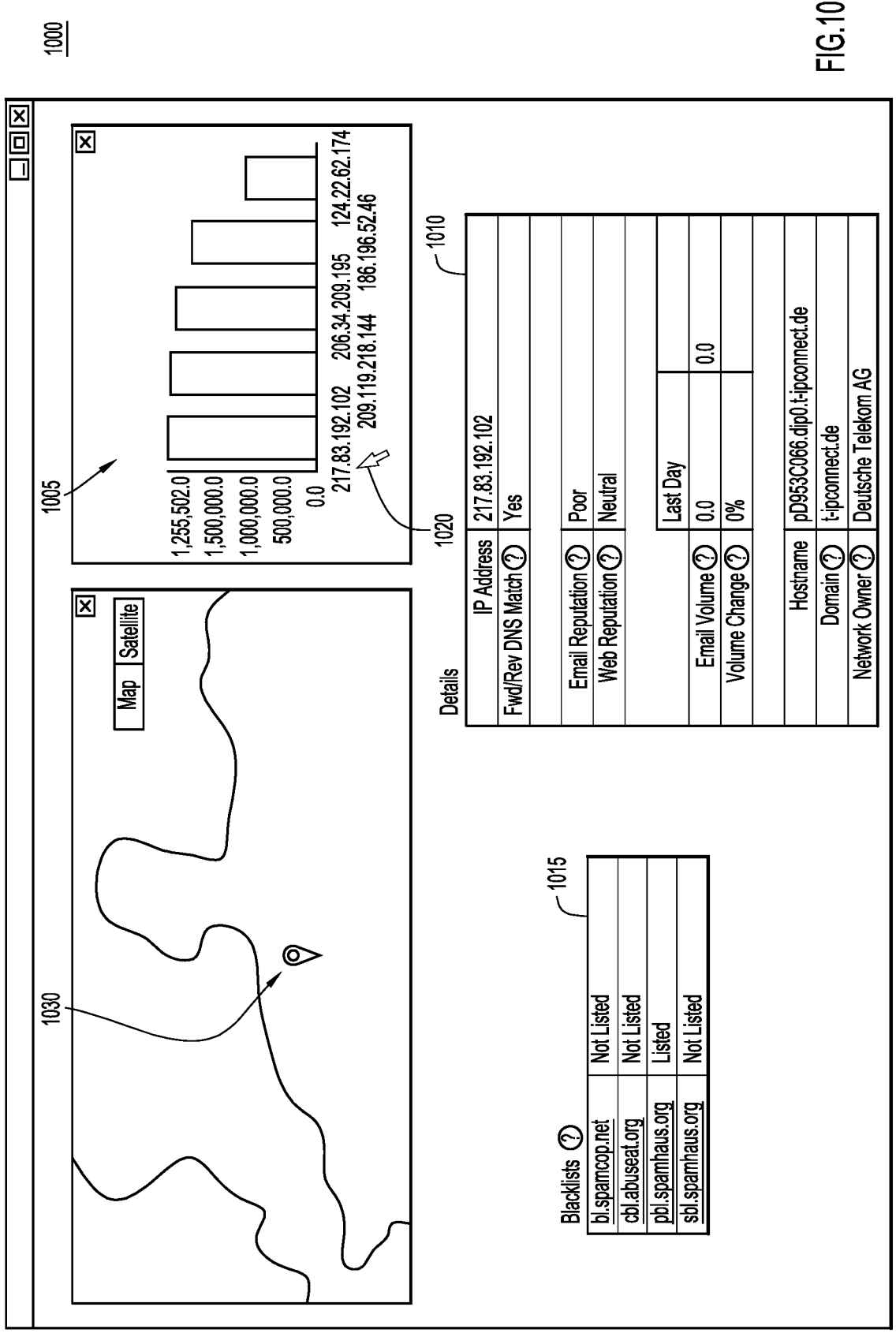
FIG. 10 is a screen shot of another UI generated in the method of FIG. 4 that shows top destinations, according to an example embodiment.

Thus, in general, algorithm 600 (i) generates a hierarchical dataset including the tuples, each tuple associated with a number of occurrences of that tuple, and generalized tuples that coalesce two or more tuples having identical attributes in corresponding ones of the attribute positions, each generalized tuple associated with a cumulative number of occurrences that is a sum of the numbers of occurrences of the tuples coalesced into the generalized tuple, and (ii) traverses the hierarchical dataset to identify the top destinations as tuples and generalized tuples having respective numbers of occurrences and cumulative numbers of occurrences above the predetermined threshold number of occurrences. As a result, the HHH algorithm creates data in the form of top destinations, such as USA, Google.com, IP1, Facebook, for example. The HHH algorithm may merge a long list of IP addresses all pointing to a same backend, e.g., Google, to avoid data skew that IP addresses alone would convey. The top destinations are presented in histograms (as shown in FIGS. 10 and 11), which allows a network administrator to easily identify the top destinations. For example, if a particular country (e.g., China) becomes one of the top destinations in the merged/coalesced data, even though a data customer does not have a site in that country, then, from a network security point of view, there may be a reason to be concerned and alert can be generated.

As described above in connection with FIG. 4, operation 415 determines bottom destinations. In an embodiment, operation 415 receives the stream of collected events (i.e., destinations) and processes the received destinations in sequence using various data structures to determine the bottom destinations, as is described below in connection with FIGS. 7 and 8.

Figure 7:
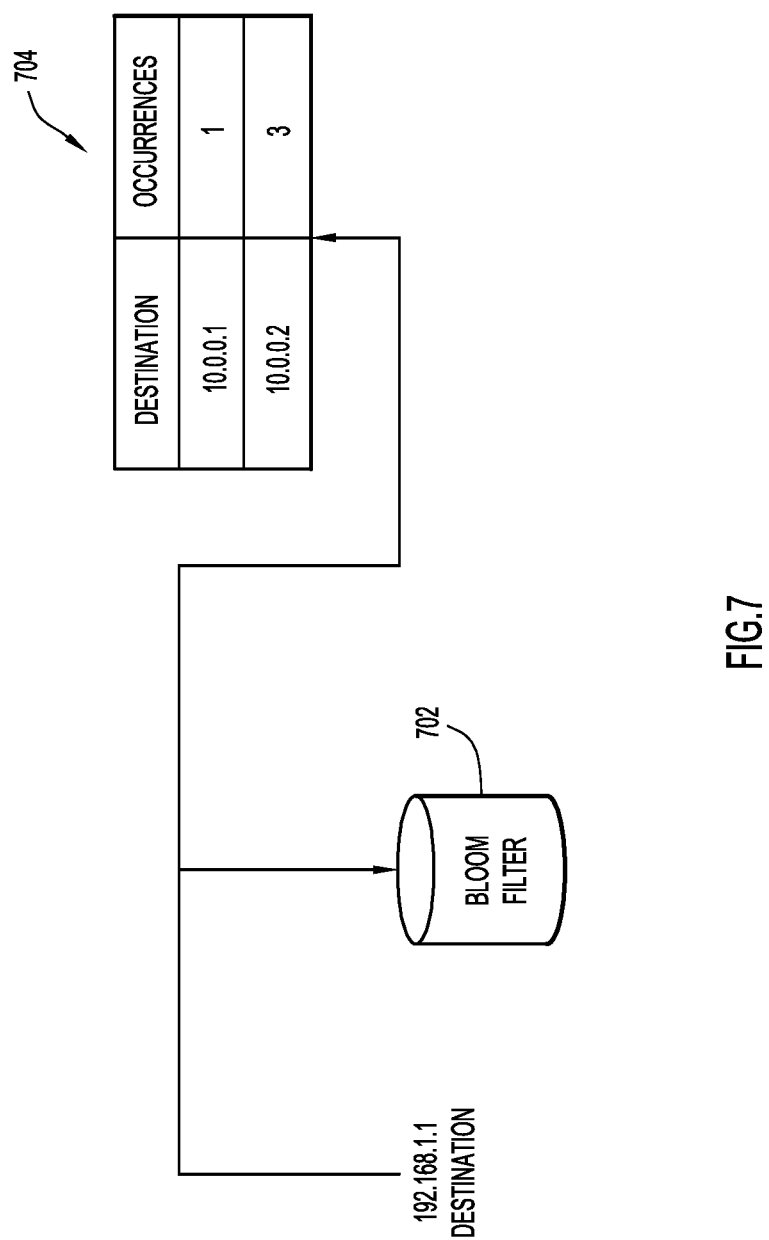
FIG. 7 is an illustration of data structures used by the network management entity to determine bottom destinations from collected events, according to an example embodiment.

With reference to FIG. 7, there is an illustration of example data structures used/maintained by operation 415 to determine the bottom destinations. The data structures include a Bloom filter 702 and a bottom destinations list 704. Bloom filter 702 is an efficient memory structure that hashes destinations (e.g., IP address 192.168.1.1) provided to the Bloom filter to a memory location in the Bloom filter. As operation 415 processes each received destination, operation 415 may either store the destination in Bloom filter 702 if the destination was not previously stored in the Bloom filter by the operation, or simply query the Bloom filter for an answer to the question: has the destination been seen/processed before? (i.e., check to see if the destination is already stored in the Bloom filter). Although Bloom filter 702 is used in the example of FIG. 7, more generally, any database configured as a space-efficient probabilistic data structure may be used in conjunction with bottom destinations list 704.

Bottom destinations list 704 may be implemented as a table or an array having a number of entries equal to the predetermined number of bottom destinations. In the example of FIG. 7, list 704 includes only 2 entries; however, any suitable number of entries may be programmed, such as 10, 20, 40, or more entries. The number of entries is adjustable/programmable. Each entry or record in list 704 stores a corresponding one of the bottom entries (destinations) and a number of occurrences for that entry, i.e., a number of times the destination has been "seen" by operation 415 as the operation processes the received destinations. The manner in which operation 415 uses Bloom filter 702 and bottom destinations list 704 is described in connection with FIG. 8.

Figure 8:
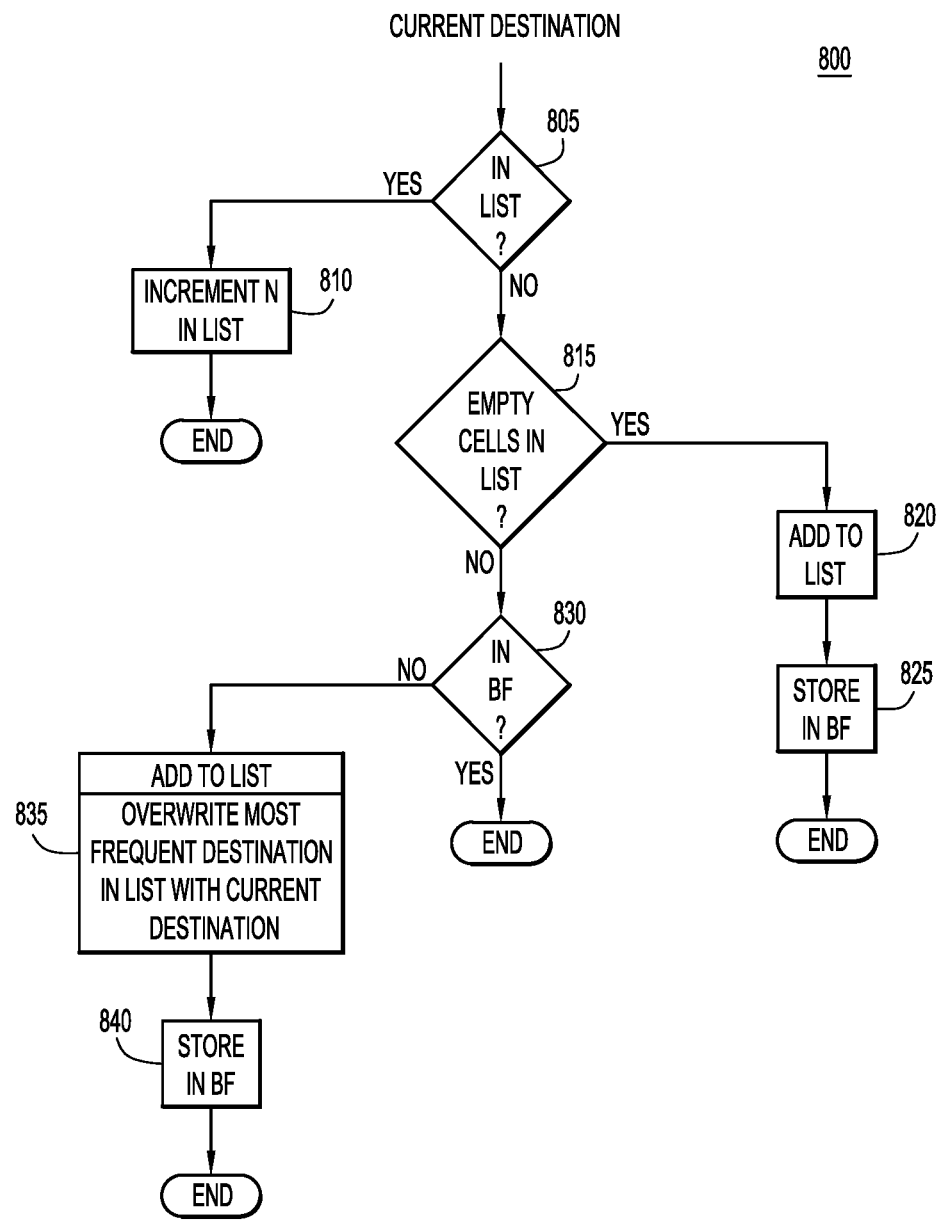
FIG. 8 is a flowchart of a method of determining bottom destinations using the data structures of FIG. 7, according to an example embodiment.

With reference to FIG. 8, there is a flowchart of a method 800 of determining bottom destinations using Bloom filter (BF) 702 and bottom destinations list 704. Method 800 includes operations expanding on operation 415. Initially, Bloom filter 702 and list 704 are empty. Method 800 receives the stream of collected destinations and processes each received destination in turn as the "current destination."

At 805, ME 120 determines if the current destination is in list 704 (i.e., is currently a bottom destination). If the current destination is in list 704, flow proceeds to 810, where ME 120 increments the associated number of occurrences N for the current destination, and the process ends. If the current destination is not in the list, flow proceeds to 815.

At 815, ME 120 determines if list 704 is not full (i.e., if there are empty cells in the array/table of the list). If list 704 is not full, flow proceeds to 820. This is a case where the current destination has not been seen in a previously processed collected event (put more simply, the current destination has not been seen before), list 704 is initially being populated (i.e., filled), and the current destination needs to be added to the list and to Bloom filter 702.

At 820, ME 120 adds the current destination to list 704 (i.e., inserts/stores the current destination in an open slot in the list) and initializes the associated number of occurrences N to 1. Flow proceeds to 825.

At 825, ME 120 stores the current destination into Bloom filter 702, and the process ends.

Returning to 815, if list 704 is full, flow proceeds to 830.

At 830, ME 120 determines if the current destination is stored in Bloom filter 702, indicating that the current destination has been seen before. If the current destination is stored in Bloom filter 702, the process ends. This is a case where the current destination has been seen before (because it is in the Bloom filter), but is not in list 704, which indicates that the current event was in list 704 previously, but was replaced with another less frequently seen destination. Bloom filter 702 catches this condition because it records and retains the previous occurrence of the current destination, whereas list 704 does not.

On the other hand, if the current destination is not stored in Bloom filter 702, indicating that the current destination has not been seen before (and is, therefore, a destination with a low number of occurrence that should be on list 704), flow proceeds to 835 to update list 704.

At 835, ME 120 replaces/overwrites in list 704 the destination having the highest number of occurrences with the current destination, and initializes the associated number of occurrences N to 1. Flow proceeds to 840, where ME 120 stores the current destination to Bloom filter 702 because the current destination has not been seen before, and the process ends.

In method 800, operations 820 and 835 both update list 704 with the current destination, but under different situations. Operation 820 updates list 704 with the current destination if the current destination has not been seen before and the list is not fully populated. In contrast, operation 835 updates list 704 with the current destination if the current destination has not been seen before, but the list is full, so the current destination overwrites the listed destination having the highest number of occurrences. Bloom filter 702 indicates whether the current destination was seen before, but was dropped from list 704 in favor of a less frequently seen destination—in which case the current destination should not be added to list 702.

Summarizing method 800, for each current destination, Bloom filter 702 is checked to determine whether the current destination has been seen before. If not, the current destination is added to Bloom filter 702. Also, bottom destinations list 704 is checked for the presence of the current destination. If the current destination is in list 704, the associated counter is incremented. If the current destination is not in list 704, the following actions are taken:
  a. If there are empty cells in the list, the current destination is stored in one of the empty cells, and its associated counter is initialized to 1.
  b. If there are no empty cells (and the current destination was not in Bloom filter 702), the most frequently seen destination in list 704 is overwritten with the current destination.

Figure 9:
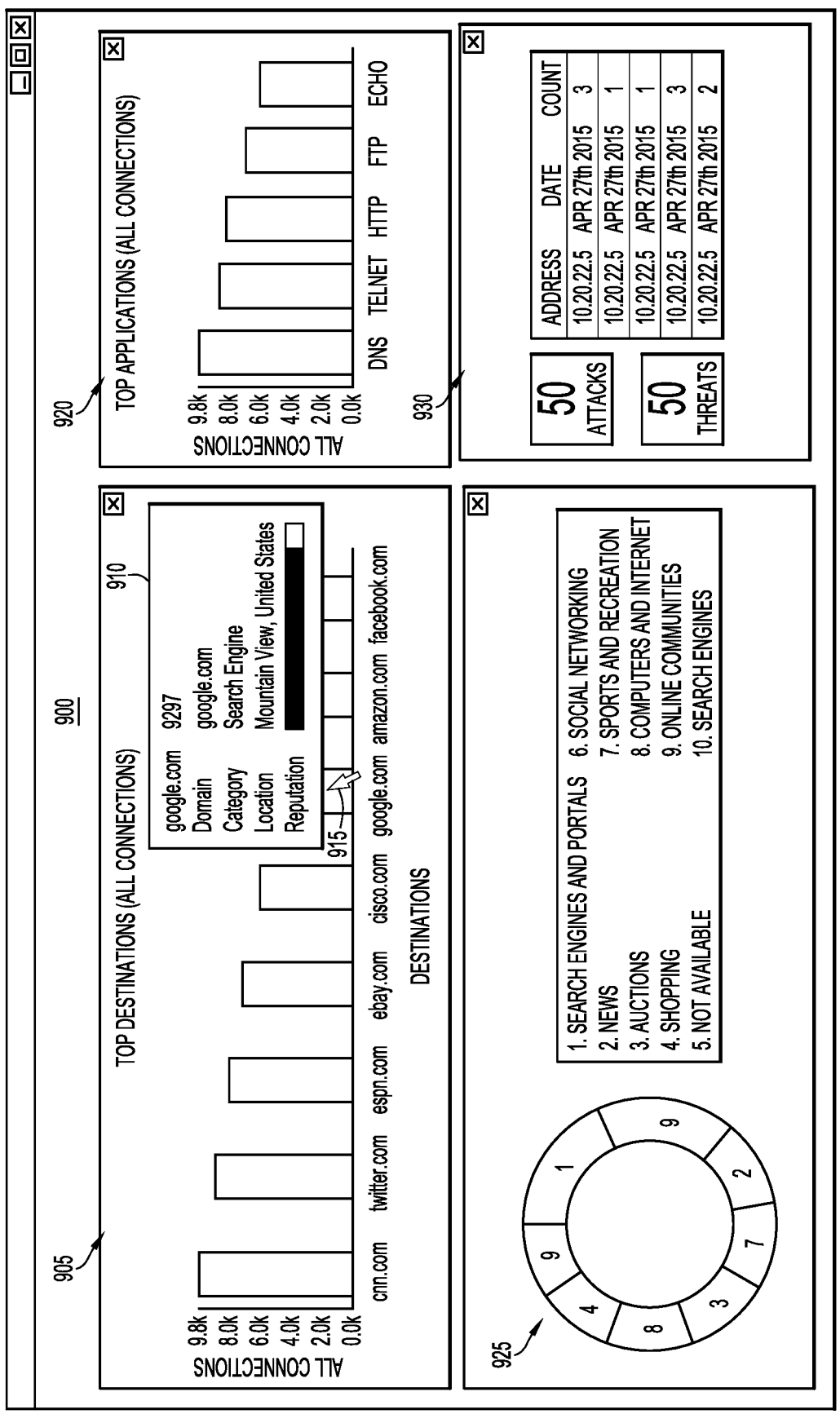
FIG. 9 is a screen shot of a user interface (UI) generated in the method of FIG. 4 that shows top destinations, according to an example embodiment.

With reference to FIG. 9, there is shown a screen shot of an example user interface (UI) 900 generated for display by ME 120 at operation 420. In an upper left-hand corner of UI 900, the UI presents top destinations 905 in a bar chart or a histogram form, which plots destination names vs. number of occurrences (referred to as "all connections"). The various top destinations are presented in an order of decreasing frequency of occurrence. In addition, UI 900 may also show bottom destinations in a form similar to the top destinations. UI also includes an enrichment window 910 superimposed over the histograms. Enrichment window 910 presents enrichment information (e.g., number of occurrences, name, category, location, and reputation) for the destination Google.com responsive to a selection of that destination by a user using cursor 915. To make the selection, the user may hover cursor 915 over the Google.com histogram, or click on the histogram, which causes the selection to be sent to ME 120. UI 900 also presents top accessed applications 920, top web categories 925, and a list of attacks and threats 930.

With reference to FIG. 10, there is shown a screen shot of another example user interface (UI) 1000 generated for display by ME 120 at operations 420. In an upper right-hand corner of UI 1000, the UI presents top destinations 1005 in a bar chart or a histogram form, which plots destination IP addresses vs. number of occurrences. UI 1000 also includes enrichment windows 1010 and 1015 that present enrichment information for destination IP address=217.83.192.102 selected via cursor 1020. UI 1000 also presents a geographical location 1030 of the selected IP address in map form.

Figure 11A:
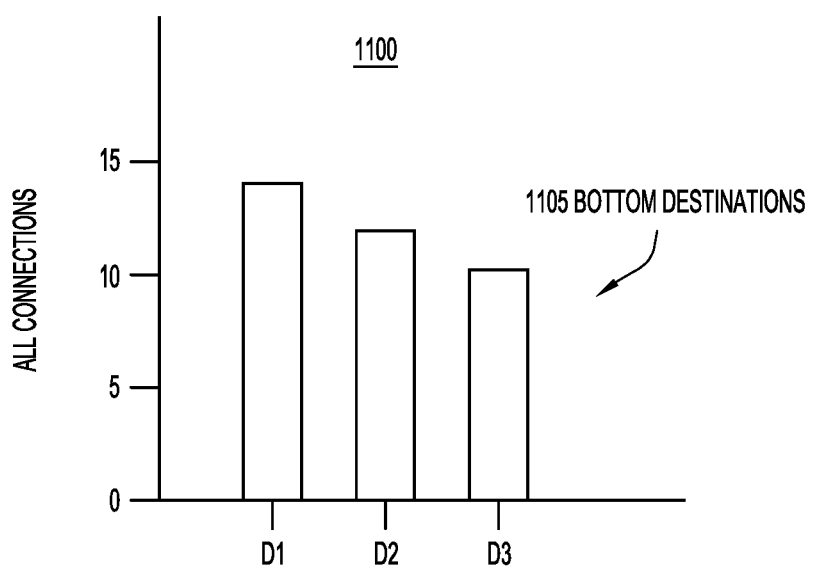
FIG. 11A is an illustration of a UI generated in the method of FIG. 4 that shows bottom destinations, according to an example embodiment.

With reference to FIG. 11A, there is shown an example UI 1100 that presents bottom destinations 1105 (D1, D2, and D3) in a bar chart or histogram form.

Figure 11B:
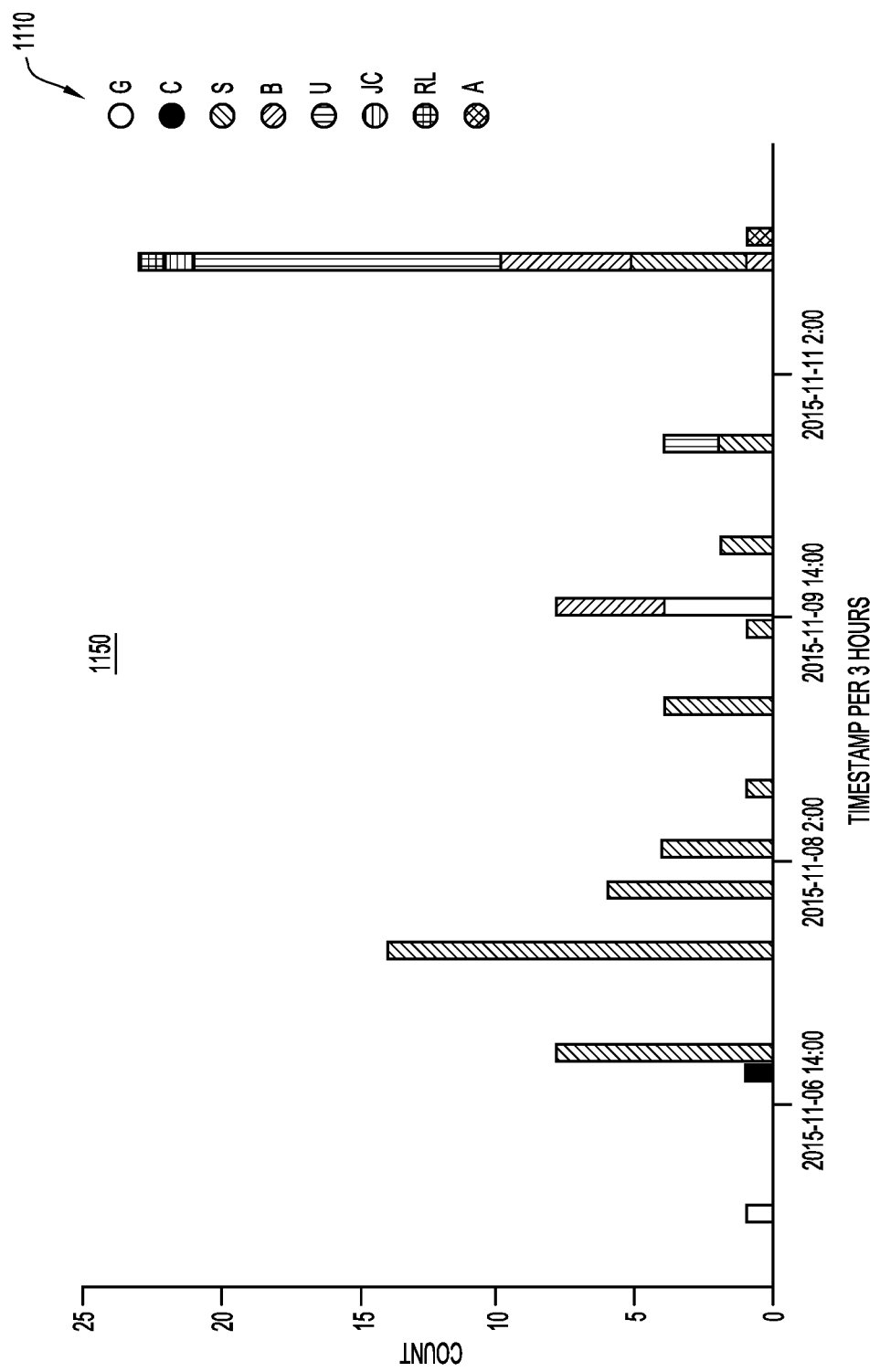
FIG. 11B is a screen shot of a UI that presents destinations as histograms plotted along a time segment axis, according to an embodiment.

With reference to FIG. 11B, there is screen shot of an example UI 1150 that presents destinations 1105 in bar chart or histogram, where the histograms are plotted along a time segment axis (x-axis) vs. counts or numbers of occurrences (y-axis). Each vertical bar may be partitioned into different destinations that are coded (e.g., color or hatching coded) to indicate a corresponding destination in accordance with a key 1110. In key 1110, each letter G, C, S, . . . A indicates a corresponding destination. The indicated destinations may be IP addresses, domain names, or applications. Top destinations in a given time segment may be discerned from a comparison of the lengths of the partitions in each vertical bar.

Figure 12:
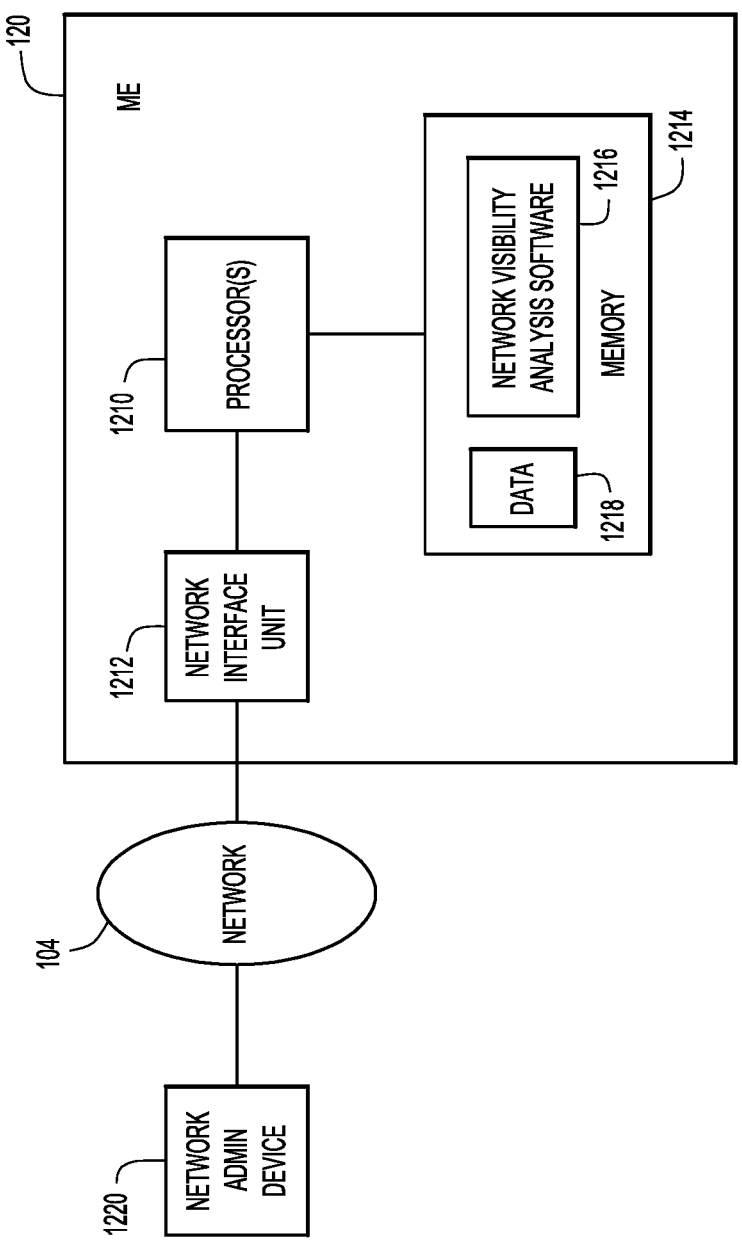
FIG. 12 is a block diagram of an implementation of the network management entity, according to an example embodiment.

With reference to FIG. 12, there is shown a hardware block diagram for ME 120. In an example, ME 120 includes a computer system, such as a server, having one or more processors 1210, a network interface unit 1212, and a memory 1214. Memory 1214 stores control software 1216 (referred as "network visibility analysis software"), that when executed by the processor(s) 1210, causes the computer system to perform the various operations described herein for ME 120.

The processor(s) 1210 may be a microprocessor or microcontroller (or multiple instances of such components). The network interface unit (NIU) 1212 enables ME 120 to communicate over wired connections or wirelessly with a network (e.g., network 104). NIU 1212 may include, for example, an Ethernet card or other interface device having a connection port that enables ME 120 to communicate over the network via the connection port. In a wireless embodiment, NIU 1212 includes a wireless transceiver and an antenna to transmit and receive wireless communication signals to and from the network.

The memory 1214 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1214 may comprise one or more tangible (non-transitory) computer readable storage media (e.g., memory device(s)) encoded with software or firmware that comprises computer executable instructions. For example, control software 1216 includes logic to implement modules/processes 220-226, Bloom filter 702, and bottom destinations list 704. Thus, control software 1216 implements the various methods/operations described above. Control software 1216 also includes logic to implement/ generate for display GUIs as necessary in connection with the above described methods/operations.

Memory 1214 also stores data 1218 generated and used by control software 1216, including data in KPI database 230, Bloom filter 702, and list 704.

A user, such as a network administrator, may interact with ME 120, to receive reports, change algorithms, etc., through GUIs by way of a user device 1220 (also referred to as a "network administration device") that connects by way of a network (e.g., network 104) with ME 120. The user device 1220 may be a personal computer (laptop, desktop), tablet computer, SmartPhone, etc., with user input and output devices, such as a display, keyboard, mouse, and so on. Alternatively, the functionality and a display associated with user device 1220 may be provided local to or integrated with ME 120.

In summary, presented herein is a system and methods that involves frugality in terms of computing and storage needs. On a medium to high volume connection system, it is possible to collect less than 1% of the network access event data, but still present a good approximation of, e.g., 20-40, top and bottom entities (e.g., destinations). It is often the case that a network administrator has the most interest in the top and bottom entities. These techniques combine statistical, critical and threat data with very little storage requirements.

In one form, a method is provided comprising: at a management entity configured to communicate with one or more network security devices, each network security device configured to store in a respective event queue an event for each attempt to access a network accessible destination through the security device, wherein each event indicates the destination of the attempted access: periodically collecting from the event queues the stored events so that less that all of the events stored in the event queues over a given time period are collected; determining, based on the collected events, top destinations as the destinations that occur most frequently in the collected events; determining, based on the collected events, bottom destinations as the destinations that occur least frequently in the collected events; generating for display indications of the top destinations; and generating for display indications of the bottom destinations.

In another form, an apparatus is provided comprising: a network interface unit configured to communicate over a network with one or more network security devices, each network security device configured to store in a respective event queue an event for each attempt to access a network accessible destination through the security device, wherein each event indicates the destination of the attempted access; and a processor coupled to the network interface unit and configured to: periodically collect from the event queues the stored events so that less that all of the events stored in the event queues over a given time period are collected; determine, based on the collected events, top destinations as the destinations that occur most frequently in the collected events; determine, based on the collected events, bottom destinations as the destinations that occur least frequently in the collected events; generate for display indications of the top destinations; and generate for display indications of the bottom destinations.

In yet another form, a non-transitory tangible computer readable storage media encoded with instructions is provided. The instructions, when executed by a processor of a management entity configured to communicate with one or more network security devices, each network security device configured to store in a respective event queue an event for each attempt to access a network accessible destination through the security device, wherein each event indicates the destination of the attempted access, cause the processor to: periodically collect from the event queues the stored events so that less that all of the events stored in the event queues over a given time period are collected; determine, based on the collected events, top destinations as the destinations that occur most frequently in the collected events; determine, based on the collected events, bottom destinations as the destinations that occur least frequently in the collected events; generate for display indications of the top destinations; and generate for display indications of the bottom destinations.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a management entity configured to communicate with one or more network security devices, each network security device configured to store in a respective event queue an event for each attempt to access a network accessible destination through the network security device to produce stored events, wherein each event indicates the destination of the access:
   periodically collecting from the event queues the stored events, to produce collected events:
   determining, based on the collected events, top destinations as destinations that occur most frequently in the collected events;
   determining, based on the collected events, bottom destinations as destinations that occur least frequently in the collected events by processing the collected events so as to populate over time an initially empty bottom destinations list which includes a respective number of occurrences associated with each destination in the bottom destinations list, with the destinations that occur least frequently in the collected events, the processing including, for the destination specified in each collected event;
   if the destination is in the bottom destinations list incrementing the number of occurrences associated with each destination in the bottom destinations list; and
   if the destination has been seen in a previously processed collected event and is not in the bottom destinations list, not updating the bottom destinations list with the destination;
   generating for display indications of the top destinations; and
   generating for display indications of the bottom destinations.

2. The method of claim 1, wherein the determining the top destinations and the determining the bottom destinations together avoid intermediate destinations in the collected events that occur more frequently than the bottom destinations but less frequently than the top destinations.

3. The method of claim 1, wherein each event represents the destination as an Internet Protocol (IP) address and a domain name, and wherein:
   the determining the top destinations includes determining top IP addresses as the IP addresses that occur most frequently and top domain names as the domain names that occur most frequently; and
   the generating for display indications of the top destinations further includes generating for display the top IP addresses or the top domain names.

4. The method of claim 3, wherein each event further represents the destination as a geographical location of the destination, and wherein:
   the determining the top destinations includes determining top geographical locations as the geographical locations that occur most frequently; and
   the generating for display indications of the top destinations further includes generating for display the top geographical locations.

5. The method of claim 1, wherein each event represents the destination as a tuple having destination attributes in attribute positions of the tuple, and the determining the top destinations includes:

generating a hierarchical dataset of the tuples and generalized tuples that coalesce two or more tuples having identical attributes in corresponding ones of the attribute positions; and identifying the top destinations as tuples and generalized tuples in the hierarchical data set based on a number of occurrences of each tuple in the collected events.

6. The method of claim 5, wherein:

the generating includes:

counting the number of occurrences of each of the tuples in the collected events; and generalizing on a first of the attribute positions in each of the tuples, coalescing into the generalized tuples each of the tuples having identical attributes in the first of the attribute positions, each of the generalized tuples having a cumulative number of occurrences that is a sum of numbers of occurrences of the tuples coalesced into the generalized tuples; and the identifying includes identifying the top destinations based on the numbers of occurrences of the tuples, the cumulative numbers of occurrences, and a predetermined threshold number of occurrences indicative of top destination status.

7. The method of claim 6, wherein the identifying further includes identifying the top destinations as (i) each of the tuples having numbers of occurrences greater than the predetermined threshold number of occurrences, and (ii) each generalized tuple having a cumulative number of occurrences that is greater than the predetermined threshold number of occurrences but that represents a sum of the numbers of occurrences of each of the tuples coalesced into the generalized tuple that are each individually less than the predetermined threshold number of occurrences.

8. The method of claim 1, wherein the bottom destinations list includes a predetermined number of the destinations that occur least frequently in the collected events.

9. The method of claim 8, wherein the processing further includes, for the destination specified in each collected event:

if the destination has not been seen in a previously processed collected event, updating the bottom destinations list to include the destination, and initializing the number of occurrences associated with each destination in the bottom destinations list.

10. The method of claim 9, wherein the updating the bottom destinations list to include the destination includes:

determining if the bottom destinations list is not full;

if the bottom destinations list is not full, adding the destination to the bottom destinations list without replacing any other destination; and if the bottom destinations list is full, replacing a highest frequency destination in the bottom destinations list that is associated with a highest number of occurrences among the destinations in the bottom destinations list with the destination and initializing the number of occurrences associated with each destination in the bottom destinations list.

11. The method of claim 9, further comprising determining if the destination has not been seen in a previously processed collected event by:

determining if the destination is stored in a database, configured as a space-efficient probabilistic data structure, that stores destinations specified in previously processed collected events;

if the destination is stored in the database, declaring that the destination has been seen in a previously processed collected event; and if the destination is not stored in the database, declaring that the destination has not been seen in a previously processed collected event.

12. The method of claim 1, further comprising:

generating for display an option to select a displayed destination for enrichment;

responsive to a selection of a displayed destination via the option, to produce a selected displayed destination, accessing cloud-based services over a communication network to collect enrichment information, including reputation or category information, for the selected displayed destination; and generating for display the enrichment information, including the reputation or the category information, in association with the selected displayed destination.

13. An apparatus comprising:

a network interface unit configured to communicate over a network with one or more network security devices, each network security device configured to store in a respective event queue an event for each attempt to access a network accessible destination through the network security device, to produce stored events, wherein each event indicates the destination of the access; and a processor coupled to the network interface unit and configured to:

periodically collect from the event queues the stored events, to produce collected events;

determine, based on the collected events, top destinations as destinations that occur most frequently in the collected events;

determine, based on the collected events, bottom destinations as destinations that occur least frequently in the collected events by processing the collected events so as to populate over time an initially empty bottom destinations list, which includes a respective number of occurrences associated with each destination in the bottom destinations list, with the destinations that occur least frequently in the collected events, the processing including, for the destination specified in each collected event:

if the destination is in the bottom destinations list, incrementing the number of occurrences associated with each destination in the bottom destinations list; and if the destination has been seen in a previously processed collected event and is not in the bottom destinations list, not updating the bottom destinations list with the destination;

generate for display indications of the top destinations; and generate for display indications of the bottom destinations.

14. The apparatus of claim 13, wherein each event represents the destination as an Internet Protocol (IP) address and a domain name, and wherein the processor is configured to:

determine the top destinations by determining top IP addresses as the IP addresses that occur most frequently and top domain names as the domain names that occur most frequently; and generate for display indications of the top destinations by generating for display the top IP addresses or the top domain names.

15. The apparatus of claim 13, wherein each event represents the destination as a tuple having destination attributes in attribute positions of the tuple, and the processor is configured to determine the top destinations by:
generating a hierarchical dataset of the tuples and generalized tuples that coalesce two or more tuples having identical attributes in corresponding ones of the attribute positions; and
identifying the top destinations as tuples and generalized tuples in the hierarchical data set based on a number of occurrences of each tuple in the collected events.

16. The apparatus of claim 13, wherein the processor is further configured to:
generate for display an option to select a displayed destination for enrichment;
responsive to a selection of a displayed destination via the option, to produce a selected displayed destination, access cloud-based services over the network to collect enrichment information, including reputation or category information, for the selected displayed destination; and
generate for display the enrichment information, including the reputation or the category information, in association with the selected displayed destination.

17. A non-transitory tangible computer readable storage media encoded with instructions that, when executed by a processor of a management entity configured to communicate over a network with one or more network security devices, each network security device configured to store in a respective event queue an event for each attempt to access a network accessible destination through the network security device, to produce stored events, wherein each event indicates the destination of the access, cause the processor to:
periodically collect from the event queues the stored events, to produce collected events;
determine, based on the collected events, top destinations as destinations that occur most frequently in the collected events;
determine, based on the collected events, bottom destinations as destinations that occur least frequently in the collected events by processing the collected events so as to populate over time an initially empty bottom destinations list, which includes a respective number of occurrences associated with each destination in the bottom destinations list, with destinations that occur least frequently in the collected events, the processing including, for the destination specified in each collected event:
if the destination is in the bottom destinations list, incrementing the number of occurrences associated with each destination in the bottom destinations list; and
if the destination has been seen in a previously processed collected event and is not in the bottom destinations list, not updating the bottom destinations list with the destination;
generate for display indications of the top destinations; and
generate for display indications of the bottom destinations.

18. The computer readable storage media of claim 17, wherein each event represents the destination as an Internet Protocol (IP) address and a domain name, and wherein:
the instructions to cause the processor to determine the top destinations include instructions to cause the processor to determine top IP addresses as the IP addresses that occur most frequently and top domain names as the domain names that occur most frequently; and
the instructions to cause the processor to generate for display indications of the top destinations includes instructions to cause the processor to generate for display the top IP addresses or the top domain names.

19. The computer readable storage media of claim 17, wherein each event represents the destination as a tuple having destination attributes in corresponding attribute positions of the tuple, and the instructions to cause the processor to determine the top destinations include instructions to cause the processor to:
generate a hierarchical dataset of the tuples and generalized tuples that coalesce two or more tuples having identical attributes in corresponding ones of the attribute positions; and
identify the top destinations as tuples and generalized tuples in the hierarchical data set based on a number of occurrences of each tuple in the collected events.

20. The computer readable storage media of claim 17, wherein the bottom destinations list includes a predetermined number of the destinations that occur least frequently in the collected events.

21. The computer readable storage media of claim 17, further comprising instructions to cause the processor to:
generate for display an option to select a displayed destination for enrichment;
responsive to a selection of a displayed destination via the option, to produce a selected displayed destination, access cloud-based services over the network to collect enrichment information, including reputation or category information, for the selected displayed destination; and
generate for display the enrichment information, including the reputation or the category information, in association with the selected displayed destination.

22. The method of claim 1, wherein each event represents the destination as a tuple having destination attributes, and the determining the top destinations includes:
generating a hierarchical dataset of (i) the tuples each associated with a number of occurrences, and (ii) generalized tuples that coalesce two or more tuples having one or more identical attributes, each of the generalized tuples associated with a cumulative number of occurrences that is a sum of the numbers of occurrences of the tuples coalesced into the generalized tuple; and
identifying the top destinations as tuples and generalized tuples associated with numbers of occurrences and cumulative numbers of occurrences, respectively, greater than a predetermined threshold number of occurrences indicative of top destination status.

* * * * *

UNITED STATES PATENT AND TRADEMARK OFFICE
CERTIFICATE OF CORRECTION

PATENT NO. : 10,623,371 B2
APPLICATION NO. : 15/237142
DATED : April 14, 2020
INVENTOR(S) : Sachin Vasant et al.

Page 1 of 1

It is certified that error appears in the above-identified patent and that said Letters Patent is hereby corrected as shown below:

In the Claims

Claim 1, Column 14, Line 28, please replace "event;" with --event:--

Signed and Sealed this
Twenty-ninth Day of September, 2020

Andrei Iancu
*Director of the United States Patent and Trademark Office*